UNITED STATES PATENT OFFICE.

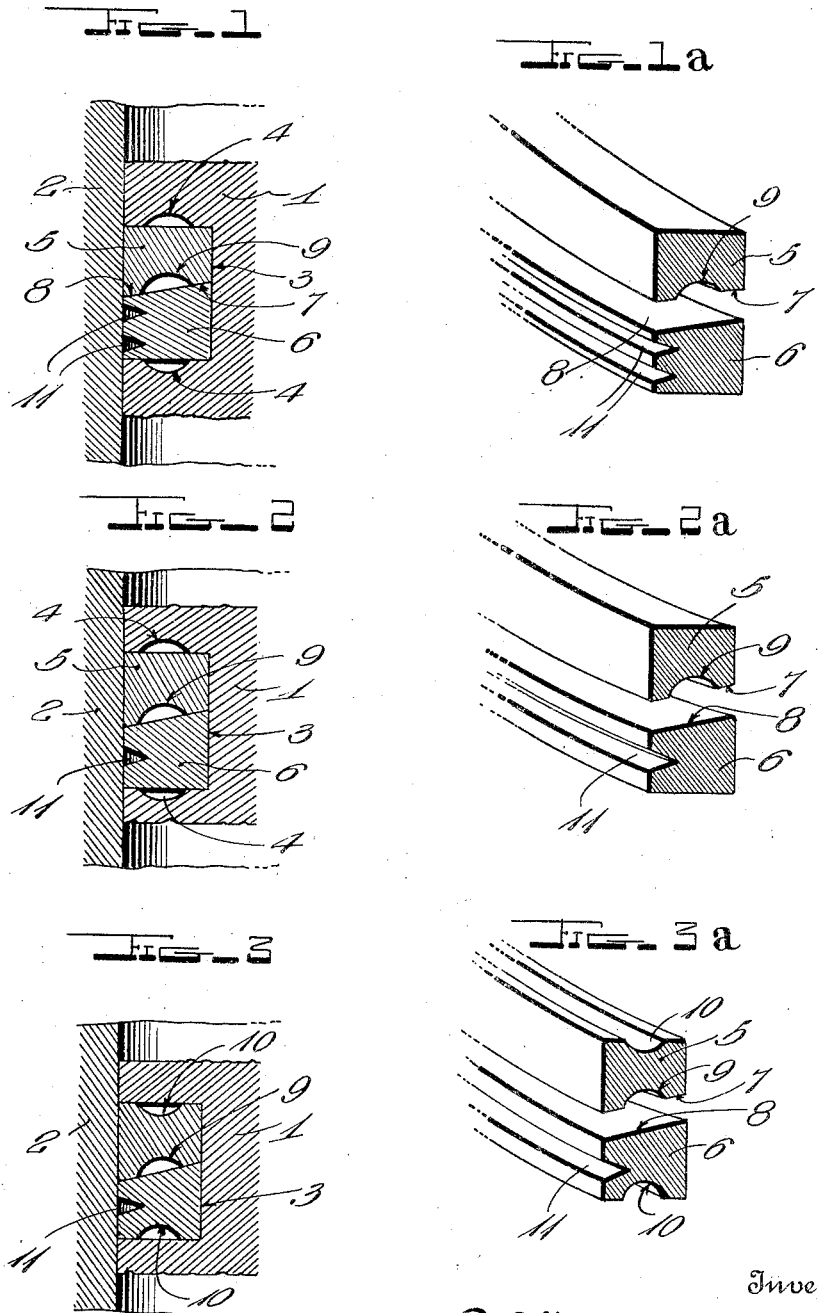

PATRICK WEIDENFELLER, OF ABERDEEN, SOUTH DAKOTA.

OILPROOF PISTON RING.

1,426,694.　　　　　　　Specification of Letters Patent.　　Patented Aug. 22, 1922.

Application filed May 10, 1920. Serial No. 380,249.

*To all whom it may concern:*

Be it known that I, PATRICK WEIDENFELLER, a citizen of the United States, residing at Aberdeen, in the county of Brown and State of South Dakota, have invented certain new and useful Improvements in Oilproof Piston Rings; and I do declare the following to be a full, clear, and exact description of the invention, such as will enable others skilled in the art to which it appertains to make and use the same.

This invention relates to an improved piston ring for use in connection with the piston of an internal combustion engine and one object of the invention is to provide a ring and piston ring groove construction which will provide room for a lubricating oil between the piston rings and walls of the ring receiving groove of the piston.

Another object of the invention is to so construct the rings and ring receiving groove that the lubricating oil may be retained in pockets and gradually fed out as the piston reciprocates in the cylinder.

Another object of the invention is to provide an improved ring which will be very simple in construction and very efficient in operation.

This invention is illustrated in the accompanying drawings wherein:

Figure 1 is a view in section showing one form of the piston ring in place.

Fig. 1ª is a view showing the rings of Fig. 1 partially in section and partially in perspective.

Fig. 2 is a view similar to Fig. 1 showing a modified construction.

Fig. 2ª is a view similar to Fig. 1ª showing the rings used in Fig. 2.

Fig. 3 is a view similar to Fig. 1 showing a modified construction.

Fig. 3ª is a view similar to Fig. 1ª showing the rings used in Fig. 3.

The piston rings will be used in connection with a piston 1 which is slidably mounted in the cylinder 2 of an internal combustion engine and this piston will be provided with a piston ring receiving groove 3. In the illustration only one ring receiving groove has been shown but it is to be understood that this illustration only shows a fragment of the piston and that this piston will be provided with the usual number of ring receiving grooves.

In the form shown in Fig. 3 the groove 3 is of an ordinary construction with straight cut walls whereas in Figs. 1 and 2, this groove 3 has its upper and lower walls provided with oil receiving grooves 4 which are relatively wide and shallow, but of sufficient depth to retain a lubricating oil. The rings 5 and 6 will fit into the groove 3 and will be of such size that they will fit snugly in the grooves and engage the walls of the cylinder. It should be noted that the contacting faces 7 and 8 of these rings are cut at an incline or diagonally of the rings as shown clearly in Figs. 1, 2 and 3, thus permitting the rings to have a close fit with each other and further permit the rings to have an engagement which will lock the rings in the groove 3 against accidental slipping out and further that this will permit the rings to have a cam action against each other which will cause the rings to have close engagement with the upper and lower walls of the groove.

Each set of rings has one ring provided with an oil groove or pocket 9 which will be relatively wide and shallow and will serve to retain a lubricating oil between the contacting faces of the rings and cause the rings to be well lubricated and permit them to move freely in the ring receiving groove for proper engagement with the walls of the cylinder. These grooves 9 should be cut in the under face 7 of the ring 5 so that the oil may feed properly out of the groove to lubricate the contacting faces of the rings. In case an excessive amount of oil should be fed out of the oil grooves 4 and 9 and oil grooves 10 which correspond to the grooves 4 in the form shown in Fig. 3, this oil would accumulate upon the walls of the cylinder and will be taken up and held in the oil groove or grooves 11 formed in the outer side face of the lower ring 6. Therefore this oil will be saved and gradually fed to the walls of the cylinder to permit the piston to slide freely. In addition to saving the oil this prevents rapid accumulation of carbon in the cylinder. It will thus be seen that with this improved construction of piston rings and ring receiving grooves a very close fit may be provided between the pistons and the walls of the cylinder and the loss of compression prevented and proper lubrication provided for.

What is claimed is:

1. A set of piston rings positioned in superposed relation with one ring having its face contacting with the second ring cut to provide an oil groove relatively wide and shallow, and one ring having its outer peripheral face cut to provide an oil groove V-shaped in cross section.

2. The combination with a piston having a piston ring receiving groove, of piston rings positioned in the groove in superposed relation, the transversely disposed faces of the groove being integral with the piston and cut to provide relatively wide and shallow oil receiving grooves.

3. The combination with a piston having a piston ring receiving groove having its opposed faces cut to provide oil receiving grooves, of piston rings positioned in the ring receiving groove in superposed relation.

In testimony whereof I have hereunto set my hand.

PATRICK WEIDENFELLER.